United States Patent Office 3,332,894
Patented July 25, 1967

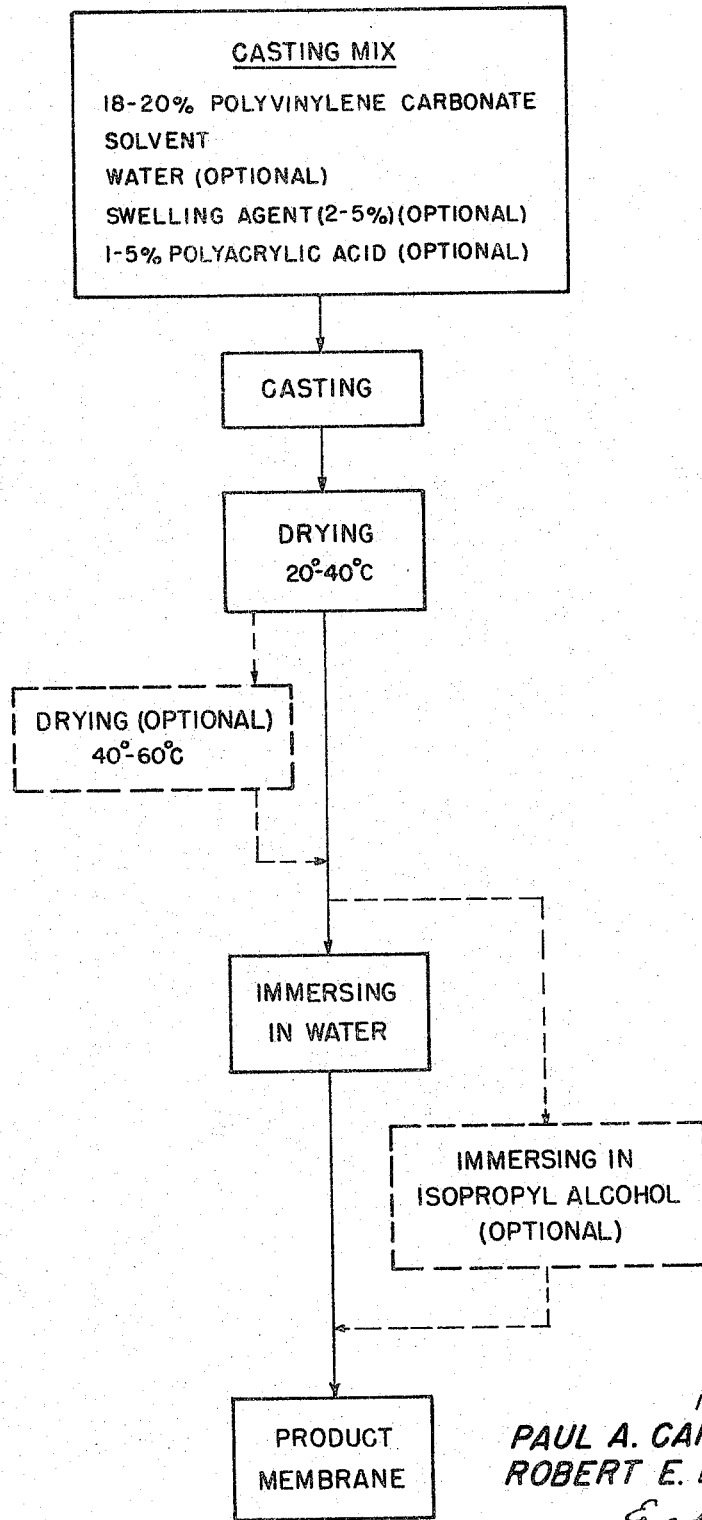

3,332,894
POLYVINYL CARBONATE DESALINATION MEMBRANE AND A METHOD OF PRODUCING THE SAME
Paul A. Cantor, Covina, and Robert E. Kesting, Mount Baldy, Calif., assignors to the United States of America as represented by the Secretary of the Interior
Filed Dec. 6, 1966, Ser. No. 599,999
7 Claims. (Cl. 260—2.5)

ABSTRACT OF THE DISCLOSURE

This invention is concerned with the production of novel membranes useful in reverse osmosis operation. The membranes are cast from a solution containing polyvinylene carbonate and may be formed into dried films or gelled membranes in single or multiple layers.

Alternatively, the membranes may be partially hydrolyzed. Superior water permeabilities have been obtained using the membranes of this invention under reverse osmosis conditions.

Background of invention

The migration of solvent through a semipermeable membrane separating two solutions of different concentration is known as osmosis. In that process the flow of solvent is from the more dilute solution into the more concentrated one. This flow can be stopped by applying a pressure equal to the osmotic pressure to the more concentrated solution. If greater than osmotic pressure is applied to the concentrated side this flow can be reversed. Then, the flow of solvent proceeds from the more concentrated solution to the less concentrated solution. Such a process is conventionally known as "reverse osmosis."

In the early development of reverse osmosis interest was focused on membranes which were permeable to water but impermeable to alcohols, sugars, high molecular weight organic substances and colloids.

Later, it was resognized that many membranes also exhibited differing degrees of semipermeability to salt solutions and in 1953 Reid et al., as reported by Breton,[1] showed that salt could be rejected from aqueous solutions simply by forcing the liquid through a suitable polymeric membrane, using pressures well in excess of the osmotic pressure. For example, with normal sea water, which has a salt content of approximately 3.5% and a corresponding osmotic pressure slightly in excess of 25 atmospheres, salt rejections of greater than 95% were obtained using driving pressures of up to 100 atmospheres and a commercially available cellulose acetate polymeric membrane. This development generated considerable interest in reverse osmosis as a means of desalting sea water and brackish waters.

Still later Loeb et al.,[2] developed a special casting technique preparing cellulosic ester membranes useful for desalination whereby increased product fluxes could be obtained. Using membranes prepared by the process of Loeb et al. in desalination it is possible to obtain at a driving pressure of 100 atmospheres a flow in excess of 10 gallons/sq. ft./day together with a salt rejection of up to 99%. Even with results such as these, reverse osmosis is not competitive with the more conventional methods of desalination such as thermal distillation. However, if improved membranes having higher water permeabilities are found, reverse osmosis, requiring no phase change and low energy costs will be in a very advantageous position with respect to the conventional desalination techniques.

Objects of invention

Accordingly, the objects of the present invention are:
To provide improved reverse osmosis membranes;
To provide improved reverse osmosis membranes containing polyvinylene carbonate;
To provide improved reverse osmosis membranes containing partially hydrolyzed polyvinylene carbonate; and
To provide improved process for preparing reverse osmosis membranes.

Brief description of the drawing

The accompanying drawing is a schematic illustration illustrating a flow diagram of the preferred embodiments of the present invention.

Description of invention

Vinylene carbonate may be synthesized by the method of Newman et. al.[3] according to the following reaction

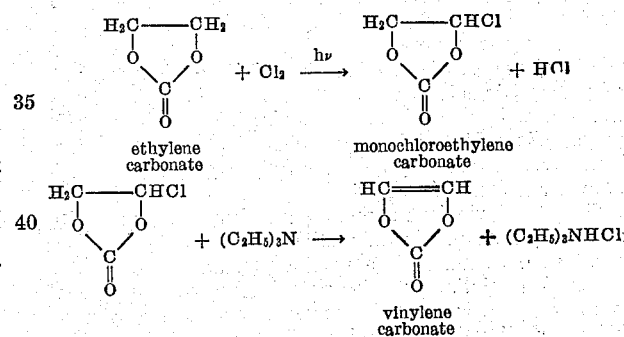

Alternatively, the chlorination may be conducted in a carbon tetrachloride solution.

In practice, it has been found that the reactions cited above do not result in a product of desired purity for forming high molecular weight polyvinylene carbonate. The chief impurities are chloroethylene carbonate and dichloroethylene carbonate. To remove traces of these halogen compounds the vinylene carbonate prepared by the above methods should be purified by heating with sodium borohydride, and then redistilled. Such a treatment removes traces of halogen compounds which interfere with a subsequent polymerization. When using commercially prepared vinylene carbonate monomer, which contains approximately 3 percent chlorine, care should be taken to provide for a careful distillation to remove these

---

[1] E. J. Breton, Jr., Office of Saline Water Research and Development, Progress Report No. 16, April 1957.
[2] U.C.L.A. Department of Engineering Report No. 60—60, July 1960, and U.S. Patents 3,133,132 and 3,133,137.
[3] M. S. Newman and R. Addor, J. Am. Chem. Soc., 75, 1263 (1953).
chain:

chlorine compounds prior to polymerization. It is preferable to distill such monomers at reflux ratios in the range of from 5/1 to 20/1 rather than to rely upon a sodium borohydride treatment. However, if the monomer sample has much less chlorine present, a simpler distillation or a sodium borohydride will suffice.

The polymerization of the purified monomer may be carried out in bulk using azobisisobutyronitrile in the range of 0.075 to 0.50 g. per 100 ml. of monomer as the initiator. The molecular weight of the resulting polymers can be varied by varying the catalyst concentrations. For example, at high catalyst concentrations the molecular weight diminishes. Initiation of the polymerization at temperatures of from about 60 to 75° C. in vacuo give excellent results. The monomer and initiator are normally charged to a vessel and subjected to a plurality of freeze-thaw cycles on a vacuum system to remove oxygen, after which the vessel is sealed and placed into an oven at about 65° C. for about 25–100 hours. The resulting polymer is dissolved in dimethylformamide to the extent of 10% and precipitated by methanol, washed in methanol, and dried in vacuo at about 40° C. Using this polymerization procedure, molecular weights approaching 1 million have been obtained.

For the purpose of the following disclosure, the term membrane is meant to include both dried films and swollen membranes exhibiting an ultra gel structure.

Fully dried films of polyvinylene carbonate may be prepared from casting solutions of from about 18–20% polyvinylene carbonate in dimethylformamide. The films are cast on glass or other smooth surface, partially dried in air at from about 20–40° C. and as an optional step, further dried in a convection oven at from about 40–60° C. Immersion of the dried films in water for a few minutes causes them to float free of the glass plates. The thickness of the films can easily be controlled by varying the thickness of the casting solution which is spread on the smooth surface. Uniformity is achieved through the use of a doctor blade. For use in reverse osmosis, the desired thicknesses are in the range of from 0.4 to 4.0 mils. For the casting of very thin films i.e., less than 0.1 millimeters acetone is the preferred solvent. The advantage of thin films is obtainment of high product-water fluxes.

Polyvinylene carbonate films containing a minor amount of polyacrylic acid also are useful in this invention. Such films have been prepared containing about 1% to 5% polyacrylic acid and have exhibited superior properties. These membranes may be made fully dry by the method above or they may be gelled.

Gelled polyvinylene carbonate membranes may be fabricated by including in the casting mix a suitable swelling agent such as magnesium perchlorate, and water. Thus the casting solution contains polyvinylene carbonate, the swelling agent, water and a solvent such as dimethylsulfoxide or dimethylformamide. Generally, the swelling agent need be present in only minor proportions. For magnesium perchlorate, amounts in the range of 2 to 5% based on the casting solution prove satisfactory; gelled membranes can be formed from casting solution which has from about 0.0 to 14% water. The casting solution is spread on a glass plate, and dried. Finally, the membranes are gelled in water, preferably below room temperature. Ice water has proved satisfactory for gellation. These gelled membranes exhibit a slightly cloudy opalescent appearance.

Finally, gelled membranes may also be formed without the use of a swelling agent if the membranes are immersed in isopropyl alcohol although, even with isopropyl alcohol, a swelling agent may be used to advantage. It has been found that the heat treating of gelled membranes has no significant effects upon their performance under reverse osmosis conditions.

Partially hydrolyzed membranes of polyvinylene carbonates are also contemplated. Polyvinylene carbonate may be partially hydrolyzed by heating it in the presence of dimethylformamide or dimethylsulfoxide. The use of dimethylsulfoxide is preferred, as dimethylformamide tends to degrade the polymer. The hydrolysis reaction is catalyzed by metal salts such as zinc chloride and magnesium perchlorate. The degree of hydrolysis should be controlled preferably to less than 25%. To achieve a finer degree of control over the hydrolysis the carbonate ester may be converted to the acetate form which may be hydrolyzed with a greater degree of accuracy.

The following examples are set forth to illustrate the present invention:

EXAMPLE 1

Film of various thicknesses were prepared from casting solutions of 18.2 to 20% polyvinylene carbonate in dimethylformamide. The films were cast on glass, partially dried in air at room temperature, and further dried overnight at 55° C. in a conventional oven. As a comparison membrane, a dried film of cellulose acetate was cast in a similar manner from a solution of acetone. Immersion of the dried films in water for a few minutes caused them to float free of the glass plates. The free films were stored in water before use; during this storage they absorbed about 17% of water. Evaluation by reverse osmosis was conducted at 1500 p.s.i. pressure with a 3.5% sodium chloride solution in a 3-inch test cell. From the flux and salt retention, the water permeability, $P_w$ (gm./cm.-sec.), was calculated using the method of Lonsdale, Merten and Riley.[4]

TABLE 1.—*Osmotic properties of fully dried films of polyvinylene carbonate*

[Reverse osmosis (1,500 p.s.i., 3.5% NaCl Solution)]

| Membrane Type | Thick., mil | $H_2O$, percent | Flux, gfd. | Salt Ret., percent | $P_w$[1], g./cm.-sec. |
|---|---|---|---|---|---|
| PV Carb.[2] | 0.5 | | 0.275 | 77.0 | $3.0 \times 10^{-7}$ |
| PV Carb. | 0.8 | | 0.265 | 85.7 | $4.4 \times 10^{-7}$ |
| PV Carb. | 0.19 | | 0.290 | 83.6 | $5.8 \times 10^{-7}$ |
| PV Carb. | 3.75 | 17.1 | 0.056 | 94.0 | $4.6 \times 10^{-7}$ |
| C.A.[3] | 1.30 | 15.7 | 0.065 | 98.4 | $1.9 \times 10^{-7}$ |
| PV Carb. (5% PAA)[4] | 4.55 | 16.8 | 0.055 | 98.2 | $5.5 \times 10^{-7}$ |

[1] Water permeability.
[2] Polyvinylene carbonate.
[3] Cellulose acetate (Eastman 398-3).
[4] Polyacrylic acid (Colloid No. X-7634A, Colloids, Inc.).

The data obtained on fully dried films or polyvinylene carbonate are given in Table 1, together with calculated values of water permeability. This data shows that the water permeability for polyvinylene carbonate films is fairly constant, ranging from $3.0 \times 10^{-7}$ to $5.8 \times 10^{-7}$ gm./cm.-sec. with membrane thicknesses ranging from 0.5 to 3.75 mils. The best salt retention, 94%, was obtained with the thickest film. With some of the thinner films, folds or creases appeared in the membrane after testing, and salt may have leaked through these or other imperfections, thus giving the lower salt retentions obtained with the thinner films.

The best polyvinylene carbonate films (94% retention) was compared with a fully dried cellulose acetate film cast from a 20% solution of Eastman 398-3 cellulose acetate in acetone, which had approximately the same water flux. From the comparative film thicknesses and the water permeabilities, it can be seen that polyvinylene carbonate has a water flux about 2.5 times greater than cellulose acetate. The water permeability of the film containing 5% polyacrylic acid showed a value 2.9 times greater than that for cellulose acetate at a salt retention of 98.2%.

---

[4] H. K. Lonsdale, U. Merten, and R. L. Riley, J. Appl. Polymer Sci., 9, 1341 (1965).

EXAMPLE 2

A very thin air-dried film of polyvinylene carbonate was prepared by casting from an 11% polyvinylene carbonate (32,000 molecular weight) in acetone solution using a 5 mil knife gap setting on glass. The fast-drying casting solution air dried in one minute before immersion in water. The film contained 16.8% $H_2O$ and was 6.3 microns thick. On testing at 1500 p.s.i. using 3.5% sodium chloride solution, a flux of 4.8 gfd. was obtained with 70% salt retention.

EXAMPLE 3

Polyvinylene carbonate was compared with cellulose acetate by means of measurement of the rate of diffusion of salt into the films while immersed in a sodium chloride solution. Films of approximately 4-mil thickness were cast and dried as in Example 1 and then equilibrated with distilled water. Rectangular sections approximately 2 x 5 cm. were cut for the salt immersion test. Twelve of these rectangular samples were immersed in 10% sodium chloride solution and duplicated examples were withdrawn at 10-minute intervals over a 50-minute time period. The last two samples were left in solution for 5 to 7 days before removal. The samples removed were rinsed, by plunging them quickly in and out of distilled water, and immediately wiped dry with tissue. After drying the samples were analyzed in duplicate for chloride by a nonaqueous volumetric method. In this method the dried films were dissolved in dimethylformamide solution, which was acidified with nitric acid; the chloride was determined by means of a semimicro potentiometric titration with silver nitrate. The average salt concentrations after time $t$ ($C_t$) and the final salt concentration ($C_f$) were computed as grams of sodium chloride per milliliter of wet membrane. Semilogarithmic plots of $(C_f - C_t)/C_f$ versus time were prepared (graphs 1 and 2 below). This concentrations function is related to the salt diffusion constant, $D_s$, and the film thickness, $x$, by the following equation:[5]

$$\text{Log}\,[(C_f - C_t)/C_f] = -\frac{D_s \pi^2 t}{2.303 x^2} + \text{Log}\,\frac{8}{\pi^2}$$

Therefore, the slope of the lines in graphs 1 and 2 are: $-D_s \pi^2 / 2.303 x^2$, from which $D_s$ may be derived. The distribution coefficient ($k$), for salt between polymer and solution is $C_f$ divided by the concentration of salt in the solution (0.107 gm./ml.). The product of the distribution coefficient $k$, and the salt diffusion coefficient $D_s$, is the salt permeability $P_s$. These values are presented in Table 2 below.

TABLE 2.—*Salt and water permeabilities of polyvinylene carbonate and cellulose acetate*

| | Film Type | |
|---|---|---|
| | Polyvinylene carbonate | Cellulose acetate |
| Immersion (10% NaCl solution): | | |
| Film thickness, mils | 4.34 | 4.46 |
| Diffusion constant, $D_s$, (cm.²/sec.) | 1.1×10⁻⁹ | 2.6×10⁻⁹ |
| Distribution coefficient $k$ | 0.24 | 0.058 |
| Salt permeability, $P_s$, (cm.²/sec.) | 2.6×10⁻¹⁰ | 1.5×10⁻¹⁰ |
| $P_w/P_s$, g./cm.³* | 1,800 | 1,300 |
| Theoretical salt retention (3.5% NaCl, 1,500 p.s.i.), percent | 98.9 | 98.6 |

*Values to two significant figures.

[5] H. K. Lonsdale, U. Merten and R. L. Riley, J. Appl. Polymer Sci., 9, 1341 (1965).

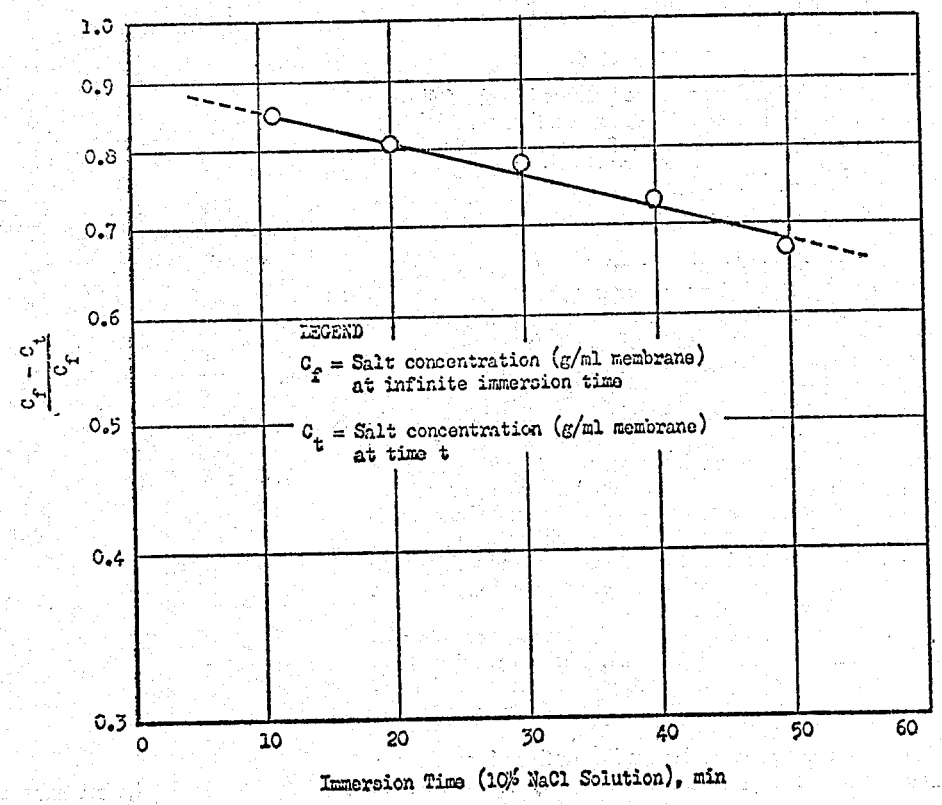

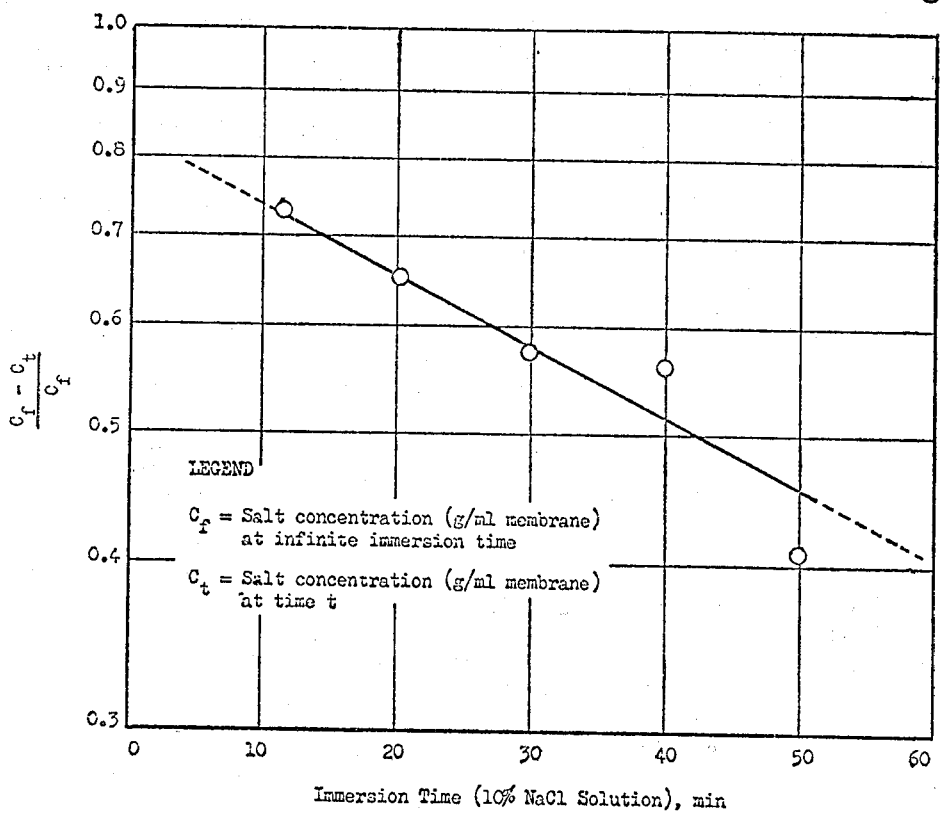

Immersion Time (10% NaCl Solution), min

The immersion studies indicate that polyvinylene carbonate has 1.7 times the salt permeability of cellulose acetate. However, it has been shown in Example 1 that polyvinylene carbonate has 2.5–2.9 times the water permeability of cellulose acetate, which more than offsets the higher salt permeability. Thus, polyvinylene carbonate is indicated to have a larger permeability ratio $P_w/P_s$ (1800) and a greater salt retention (98.9% for 3.5 sodium chloride solution at 1500 p.s.i.) than conventional cellulose acetate which exhibits values of 1300 and 98.6% respectively.

EXAMPLE 4

Two gelled membranes were prepared in the following manner. The first was cast from a solution containing 10 parts polyvinylene carbonate, 25 parts dimethylformamide, 2 parts magnesium perchlorate and 6 parts water. It was dried for 8 minutes and was 4.5 mil in thickness. Following the drying step it was heated for 5 minutes at 80° C.

The second membrane was fabricated from a partially hydrolyzed polyvinylene carbonate polymer. The hydrolysis was conducted in a solution containing 2.64 g. of polyvinylene carbonate, 12.5 g. of dimethylsulfoxide, 0.50 g. of zinc chloride and 0.54 g. of water by heating to 60° C. for 1 hour. The percent hydrolysis calculated from the volume of carbon dioxide collected was 5%. After isolation of the 5% hydrolyzed polyvinylene carbonate by precipitation in methanol, a casting solution was prepared from this hydrolyzed polymer containing 10 parts of polyvinylene carbonate, 24 parts of dimethylformamide, 2 parts of magnesium perchlorate and 4 parts water. This formulation was wet cast (10 mils thick) on glass and air dried 30 minutes before gellation in water. Its thickness was 3.2 mils.

The membranes were tested under reverse osmosis conditions (3.5% NaCl, 1500 p.s.i.). The unhydrolyzed gel exhibited a flux of 3.0 gfd. and a salt retention of 52% and the partially hydrolyzed membrane gave a flux of 0.6 gfd. and a salt retention of 72%.

While the above examples are illustrative of membranes made under the present invention they are not to be interpreted as limiting. It will be apparent to those skilled in membrane technology that various adaptations and modifications of the invention as described herein are within the scope and intent of the invention.

What is claimed is:

1. The method of making a reverse osmosis membrane comprising
    (a) forming a casting solution containing from 18–20% polyvinylene carbonate in a solvent selected from the group consisting of dimethylformamide, dimethylsulfoxide and acetone;
    (b) casting the solution on a smooth surface to form a thin uniform membrane layer;
    (c) drying said membrane layer at about 20–40° C.;
    (d) immersing said membrane layer in water to cause it to float free of the smooth surface.
2. The method of claim 1 wherein the membrane layer is heated to about 40–60° C. following the drying step.
3. The method of claim 1 wherein the casting solution contains from about 0.2 to 1% polyacrylic acid.
4. The method of claim 1 wherein the casting solution contains from 4.0 to 5.0% magnesium perchlorate and from 10 to 15% water.
5. The method of claim 4 wherein prior to the preparation of the casting solution the polyvinylene carbonate is hydrolyzed to from about 1 to 10%.
6. The method of claim 1 wherein the membrane layer is immersed in isopropyl alcohol rather than water.
7. The product formed by the method of claim 1.

References Cited

UNITED STATES PATENTS 3,133,132   5/1964   Loeb et al. _____ 264—49

OTHER REFERENCES

U.S. Office of Saline Water: "Saline Water Conversion Report for 1964," 37–39.

ALEXANDER H. BRODMERKEL, Primary Examiner.

P. E. ANDERSON, Assistant Examiner.